United States Patent [19]

Mori

[11] Patent Number: 4,510,617

[45] Date of Patent: Apr. 9, 1985

[54] CHARACTER RECOGNITION SYSTEM UTILIZING PATTERN MATCHING METHOD

[75] Inventor: Nobuhiko Mori, Tokyo, Japan

[73] Assignee: Nippon Electric Co., Ltd., Tokyo, Japan

[21] Appl. No.: 351,080

[22] Filed: Feb. 22, 1982

[30] Foreign Application Priority Data

Feb. 20, 1981 [JP] Japan .................................. 56-23966

[51] Int. Cl.³ .............................................. G06K 9/68
[52] U.S. Cl. .................................................... 382/33
[58] Field of Search .......................................... 382/33

[56] References Cited

FOREIGN PATENT DOCUMENTS 133335 11/1978 Japan .................................... 382/33

OTHER PUBLICATIONS

"Mask Matching Pattern Recognition System", by Schroeder, IBM Technical Disclosure Bulletin, vol. 23, No. 2, Jul. 1980, pp. 680-681.

*Primary Examiner*—John C. Martin
*Assistant Examiner*—Michael D. Parker

*Attorney, Agent, or Firm*—Sughrue, Mion, Zinn, Macpeak and Seas

[57] ABSTRACT

A character recognition system is disclosed in which an input character is compared to a plurality of standard characters. Each standard character is stored with respect to its black meshes in a first character memory area, and with respect to its white meshes in a second character memory area. The characters are stored in parallel such that one "row" of the memory corresponds to the same mesh area of each character. The input character is stored in a third memory area in terms of either its white or its black meshes. Means are provided which produce the address of the character memory area row which corresponds to an address of a mesh bit within the input character memory. The row is sequentially read out, and a counter is provided for each character. These counters are initiated when logical 1's are present in both the particular input character memory mesh bit and the corresponding character memory area bit. The outputs of the counters are cumulatively stored and compared. In this manner, the stored counter ouputs will correspond either to the extent of similarity or to the extent of dissimilarity between the input character and the standard masks, depending upon which character memory area is addressed by the address producing means.

5 Claims, 3 Drawing Figures

CHARACTER RECOGNITION SYSTEM UTILIZING PATTERN MATCHING METHOD

BACKGROUND OF THE INVENTION

This invention relates to a character recognition system utilizing a pattern matching method.

In a standard pattern matching method, the character recognition is achieved by comparison of a pattern of an input character with those of a plurality of predetermined standard masks. For this purpose, a great number of standard masks are provided; for example, at least 10 different masks for numeric characters, and 26 different masks for the letters of the alphabet. These standard masks are stored in a standard computer memory means. During the recognition cycle, the stored standard masks are sequentially read out and compared with the input pattern, to count the number of mask elements (or meshes) which are or are not coincident with the input pattern. Therefore, in the pattern matching methods of the prior art, operational time frame of the recognition cycle is increased with an increase of the standard masks.

To shorten the operational time frame, an improved pattern matching character recognition system was proposed in Japanese Patent Disclosure No. 53-133335. In the method of the disclosure, "black" and "white" meshes in the standard masks are each stored in different standard mask memories as logical 1's. In each of the standard mask memories, the meshes having the same position in the standard masks are stored at the same bit position, e.g., at the same row. The comparisons of the input pattern with the standard masks are achieved simultaneously (or in parallel) by reading out the standard mask meshes stored at the same rows of the standard mask memories. The selection between black mesh and white mesh standard mask memories is controlled in response to the pattern content of the input character.

Although the recognition cycle can be achieved at higher speeds than heretofore possible by this improved character recognition system, the memory construction is not satisfactory in that it is too large; that is, the memory construction can and should be reduced in order to increase available memory.

It is, therefore, an object of this invention to provide a small-sized character recognition system.

SUMMARY OF THE INVENTION

According to the present invention, there is provided a character recognition system in which black and white meshes in a plurality of standard masks are stored in respective areas of a standard mask memory. The meshes having a same position in the standard masks are stored at the same bit position (the same row) in each area of the standard mask memory. An input pattern is stored in an input pattern memory. The meshes in the input pattern memory are sequentially read out. This read out, along with the address of the read out, forms the "read out address data". The standard mask meshes are then read out simultaneously (with respect to the standard masks) in response to positions and contents of the read out input pattern meshes; that is, the contents of a specific row of the standard mask memory are read out when addressed by the read out address data. The read out of the addressed standard mask meshes is counted in respective counters provided in correspondence with the read out of the standard masks. A final recognition is achieved by use of the contents of the counters.

DESCRIPTION OF THE PREFERRED EMBODIMENTS

Figure 1:
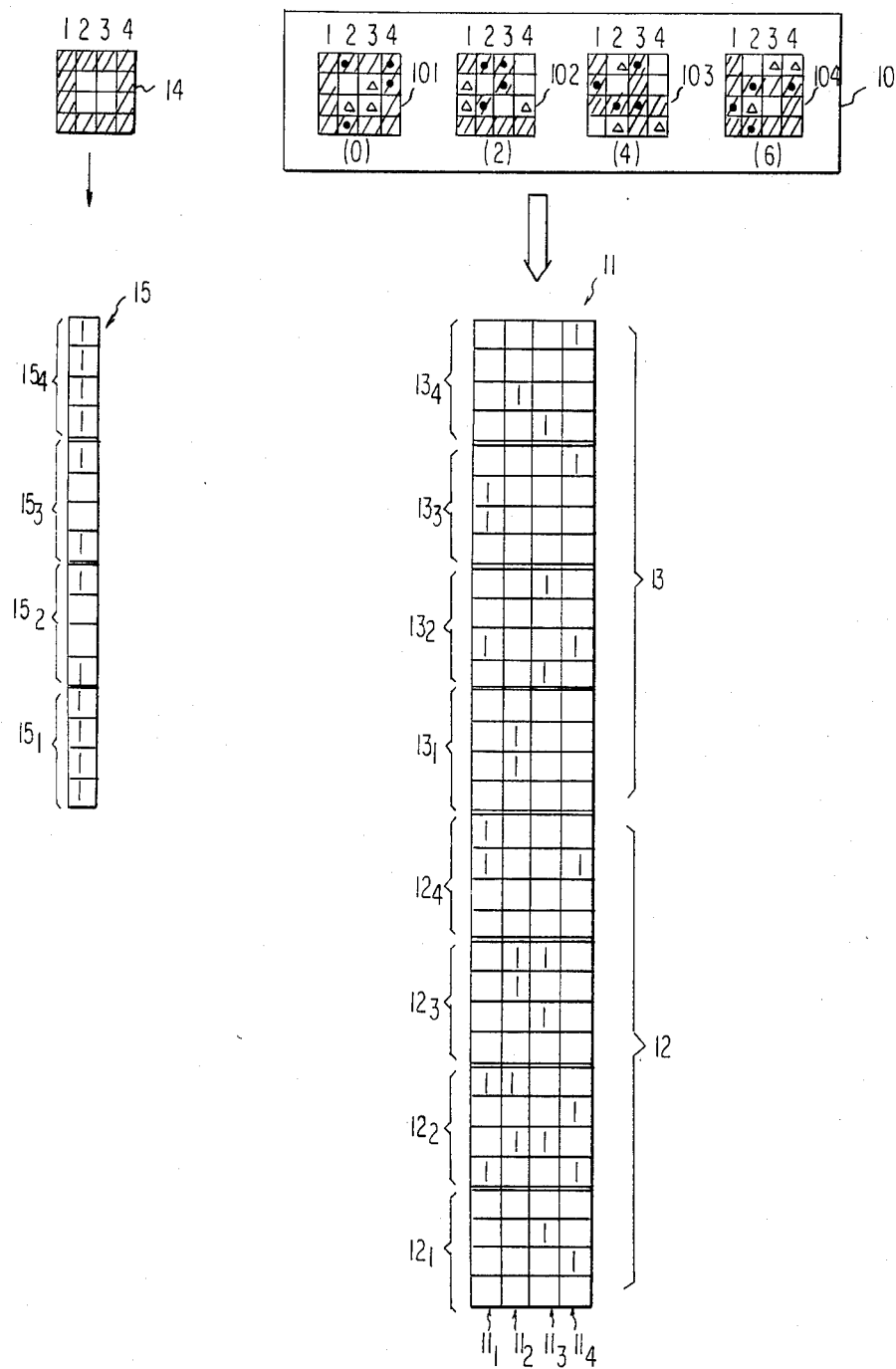
FIG. 1 shows the relationships both between an input pattern and an input pattern memory, and between a plurality of standard masks and a standard mask memory.

For simplicity, both the input pattern and the standard masks are shown in $4 \times 4$ meshes, and only four standard masks are shown in the drawings. It will be clearly understood that this invention can be applied to a character recognition system in which additional types of standard masks, and an input pattern of more meshes, are used.

Referring to FIG. 1, standard masks 10 are shown in which four standard masks 101, 102, 103 and 104 for numerals 0, 2, 4 and 6 are comprised of $4 \times 4$ meshes and symbols. The symbols · and Δ represent meshes which are black meshes and white meshes, respectively. Patterns represented by hatched meshes are the recognition characters, i.e., numerals 0, 2, 4 and 6.

The standard masks 10 are stored in a standard mask memory 11, such as a read-only-memory (ROM), and have black mesh and white mesh areas 12 and 13 comprised in the following manner: the black and white meshes, as represented by the symbols · and Δ, respectively, are stored in the black mesh and white mesh areas 12 and 13, respectively, as logical 1's. The black meshes in the first to fourth columns of the standard masks 10 are stored in the first to fourth portions $12_1$ to $12_4$, respectively, and the white meshes are likewise stored in the first to fourth portions $13_1$ to $13_4$, respectively, such that the standard masks 101 to 104 are stored in the first to fourth columns $11_1$ to $11_4$, respectively. For example, column $11_1$ of portion $12_1$ corresponds to the black meshes in column 1 of standard mask 101 as read from bottom to top; column $11_1$ of portion $12_2$ corresponds to the black meshes in column 2 of standard mask 101 as read from bottom to top, etc. Thus, the meshes having the same mesh position in the standard masks 101 to 104 are stored at the same bit position, i.e., at the same row in the different columns $11_1$ to $11_4$, respectively, of the memory portions.

An input character is sampled by $4 \times 4$ meshes and quantized to black and white meshes to provide an input pattern 14, in which the black and white meshes are represented as hatched and unhatched portions, respectively. The input pattern 14 is stored in an input pattern memory 15 such as a random access memory (RAM) or a shift register. The meshes in the first to fourth columns, as read from bottom to top, 1's are stored in the first to fourth portions $15_1$ to $15_4$, respectively, and the black and white meshes are stored as logical 1's and 0's, respectively.

Figure 2:
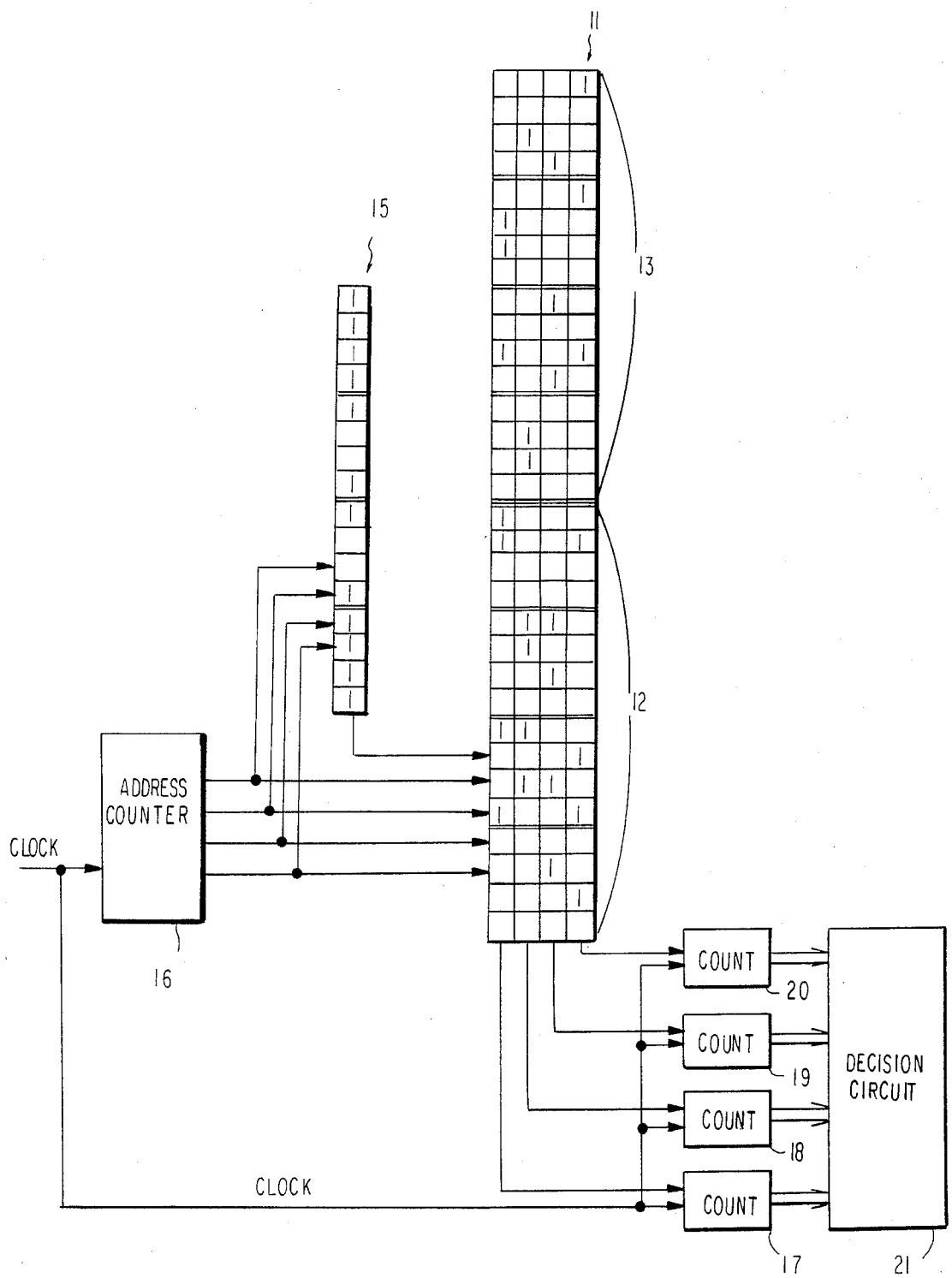
FIG. 2 is a block diagram of a first embodiment of the present invention.

Referring to FIG. 2, a first embodiment of this invention comprises the standard mask memory 11 in which the standard masks 101 to 104 have been stored. An input pattern is stored in the input pattern memory 15 in the abovementioned way. An address counter 16 is provided which produces 4-bit address data in response to a clock pulse train. The 4-bit address data is applied to the input pattern memory 15, such that the stored input pattern mesh data is sequentially read out (one bit at a time). The read out mesh data is applied, together with the 4-bit address data from the address counter 16, as "read out address data" to the standard mask memory 11. The read out address data for the standard mask memory 11 is in the form of a 5-bit word composed of the read out mesh data as the most significant bit (MSB) and 4-bit data from the counter 16 as lower bits.

The MSB of the 5-bit address data is used for a read out selection between the black and white areas 12 and 13. When the MSB is logical 1, a black mesh of the input pattern is read out, and the white memory portion 13 is selected; when the MSB is logical 0, corresponding to the read out of the white mesh of the input pattern, the black memory portion 12 is selected. The read out address, i.e., the read out row in the selected memory portion, is designated by the lower four bits. In other words, the row of the standard mask memory 11 having the same bit position as that of the corresponding mesh of the input memory pattern 15 is designated by the 4-bit address data supplied from the address counter 16. Thus, 4-bit data with respect to the same mesh position of the four standard masks are read out from the standard mask memory 11. This row-by-row comparison enables a simultaneous bit-by-bit comparison to be made between the standard words and the input mesh. In this embodiment, the black and white areas 12 and 13 are selected by the read out white and black meshes from the input pattern memory 15, respectively, such that the read out data of logical 1 from the standard mask memory 11 represents dissimilarities between the input pattern and the standard masks; that is, we read out a logical 1 when, for example, white meshes in the standard mask memory are at the same position as a black mesh in the input pattern memory.

The read out data is applied in parallel to the enable terminals of counters 17 to 20, which are provided in correspondence with the standard masks 101 to 104, respectively. The counters 17 to 20 are also supplied with the clock pulse train at their respective clock terminals. The counters 17 to 20 count up the clock pulse when the read out data of logical 1 (representing the unmatched masks) is applied from from the standard mask memory 11 thereto. Thus, the degree of correspondence between the standard masks and the input pattern is gauged by the counters; the more logical 1's received by a particular counter corresponding to a particular character, the more clock pulses are counted, indicating the extent of dissimilarity between the standard mask and the input pattern.

The differentiae (or number of clock pulses) held in the counters 17 to 20 are supplied to a decision circuit 21 for recognizing the input character. One example of the decision circuit 21 for recognizing by use of the differentiae is disclosed in my copending application Ser. No. 350,037 having the priority date of Feb. 18, 1981 based on the Japanese Patent Application No. 56-22563.

Figure 3:
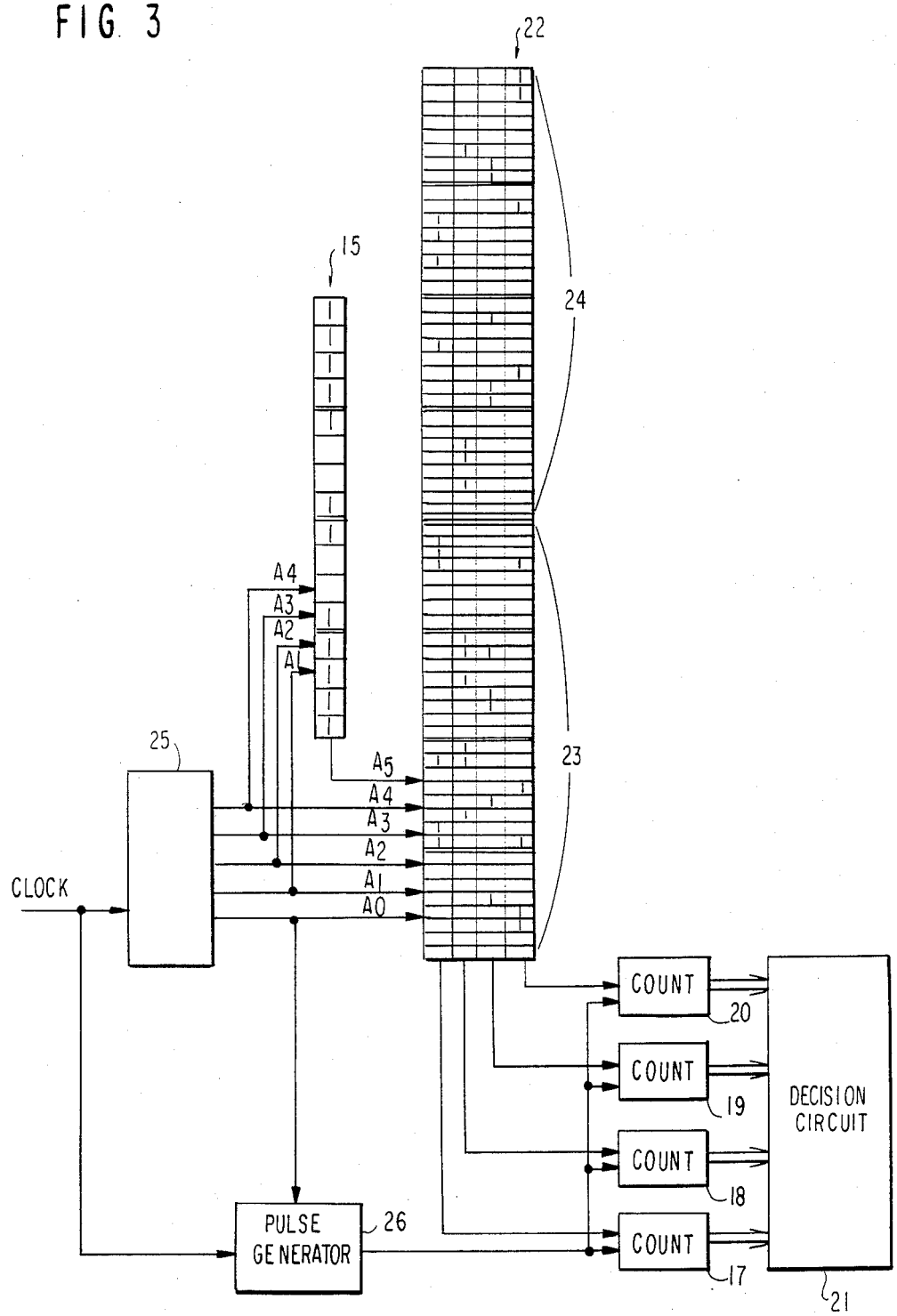
FIG. 3 is a block diagram of a second embodiment of the present invention.

Referring to FIG. 3, another embodiment of the present invention will now be disclosed. In FIG. 3, the standard mask memory 22 has black mesh and white mesh areas 23 and 24, respectively, and has the stored black and white meshes "weighted" in three steps. In other words, the meshes weighted in first, second and third steps are stored in the form of [0, 1], [1, 0] and [1, 1] in the [upper, lower] subrows in each row of the standard mask memory 22.

A 5-bit address counter 25 produces the address data for the input pattern memory 15 and the standard mask memory 22. The least significant bit (LSB) $A_0$ of the address data designates a sub-row in each row of the standard mask memory 22. The rows in the input pattern memory 15 and the standard mask memory 22 are designated by the upper four bits $A_1$ to $A_4$. When data for one mesh is read out from the input pattern memory 11, two sub-rows (lower and upper sub-rows) of the corresponding row of the standard mask memory are also read out. The black mesh and white mesh areas 23 and 24, respectively, are designated in the read out input pattern mesh data as in the first embodiment.

The LSB $A_0$ is also applied to a pulse generator 26, which is supplied with the clock pulse. When LSB $A_0$ is logical 0, i.e., when the lower sub-row is designated, the pulse generator 26 generates one pulse when the LSB $A_0$ is logical 1, i.e., when the upper sub-row is designated, two pulses are generated.

One or two pulses from the pulse generator 26 are applied to the clock terminals of the counters 17 to 20, which count up these pulses when the read out data from the standard mask memory 22 is logical 1 as in the first embodiment. The "differentiae" are supplied to the decision circuit for recognition of the input character.

In the first and second embodiments, the black mesh and white mesh areas of the standard mask memory are compared with the white mesh data and black mesh data of the input pattern, respectively, to provide the differentiae between the input pattern and the standard masks. In order to directly provide the degree of similarity between the input pattern and the masks, the invention would be modified such that the black mesh and white mesh portions of the standard masks are compared with the black and white mesh data of the input pattern, respectively.

In summary, the character recognition system of the present invention utilizes standard masks which are stored in a single memory means having black mesh and white mesh areas, the reading out from which is selected in response to the input pattern mesh data. This storage in a single memory makes it possible to both reduce the number of memory means and IC's and realize high comparison speeds.

What is claimed is:

1. A character recognition system for recognizing an input pattern by comparing with a plurality of standard masks, said input pattern being composed of input black and white meshes, each of said standard masks having standard black and white meshes which are to be black and white, respectively, said system comprising:
   first memory means for storing said standard masks in the form of standard meshes weighted in plural steps, said first memory means having at least two memory areas, said standard black and white meshes being stored in different memory areas;
   means for producing first read out address data;
   means for reading out the stored data from said first memory means in response to said first read out address data and input mesh data of said input pattern as second read out address data, the reading out of said standard black and white meshes from said memory areas being selected in response to said input mesh data;
   means for counting the read out data from said first memory means.

2. A character recognition system as claimed in claim 1, further comprising second memory means for storing said input pattern, read out data from said second memory means being applied to said first memory means as said second read out address data.

3. A character recognition system as claimed in claim 1, wherein said first read out address data is applied to said second memory means.

4. A character recognition system as claimed in claim 1, wherein said reading out of said standard black and white meshes from said memory areas is selected by said input black and white meshes, respectively, whereby said counting means producing similarities between said input pattern and said standard masks.

5. A character recognition system as claimed in claim 1, wherein said reading out of said standard black and white meshes from said memory areas is selected by said input white and black meshes, respectively, whereby said counting means produce differentiae between said input pattern and said standard masks.

* * * * *

UNITED STATES PATENT AND TRADEMARK OFFICE
CERTIFICATE OF CORRECTION

PATENT NO. : 4,510,617
DATED : April 9, 1985
INVENTOR(S) : Nobuhiko MORI

It is certified that error appears in the above-identified patent and that said Letters Patent is hereby corrected as shown below:

Column 3, lines 54 and 57, "differentiae" should be

-- differentia --;

Column 4, line 26 and column 6, line 9, "differentiae"

should be -- differentia --.

Signed and Sealed this

Eighth Day of October 1985

[SEAL]

Attest:

Attesting Officer

DONALD J. QUIGG

Commissioner of Patents and
Trademarks—Designate